United States Patent
Zhang et al.

(10) Patent No.: US 8,073,090 B2
(45) Date of Patent: Dec. 6, 2011

(54) SYNCHRONOUS DE-SKEW WITH PROGRAMMABLE LATENCY FOR MULTI-LANE HIGH SPEED SERIAL INTERFACE

(75) Inventors: Liang Zhang, Shanghai (CN); Hui Wang, Shanghai (CN); Yong Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 668 days.

(21) Appl. No.: 12/218,375

(22) Filed: Jul. 11, 2008

(65) Prior Publication Data

US 2010/0008460 A1  Jan. 14, 2010

(51) Int. Cl.
*H04L 7/04* (2006.01)

(52) U.S. Cl. ........ 375/362; 375/365; 375/373; 375/343; 375/376; 713/400; 713/503; 370/509; 370/514

(58) Field of Classification Search .................. 375/376, 375/362, 365, 368, 371, 373, 343; 713/400, 713/503; 370/509, 514
See application file for complete search history.

(56) References Cited

U.S. PATENT DOCUMENTS 6,418,537 B1 *  7/2002  Yang et al. ..................... 713/400
7,500,131 B2 *  3/2009  Panikkar et al. ............... 713/503

OTHER PUBLICATIONS

JEDEC Standard No. 206, FBDIMM: Architecture and Protocol, JEDEC Solid State Technology Association, Jan. 2007, pp. 1-128.

* cited by examiner

*Primary Examiner* — Phuong Phu
(74) *Attorney, Agent, or Firm* — Haynes and Boone LLP (57) ABSTRACT

A method and system for performing clock calibration and de-skew on a multi-lane high speed serial interface is presented. Each of a plurality of serial lane transceivers associated with an individual bit lane receives a first data frame, comprising a training sequence header pattern. Based on each of the first data frames, the plurality of serial lane transceivers de-skew a plurality of data frames and generate a plurality of event signals. Using the plurality of event signals, a core clock, having a first phase, is adjusted to be phase aligned with the slowest bit lane.

20 Claims, 11 Drawing Sheets

SYNCHRONOUS DE-SKEW WITH PROGRAMMABLE LATENCY FOR MULTI-LANE HIGH SPEED SERIAL INTERFACE

BACKGROUND

1. Field of the Invention

The present invention relates to integrated circuit devices and methods of operating same and, more specifically, to memory devices and methods of operating memory devices.

2. Discussion of Related Art

Fully-buffered dual in-line memory modules ("FB-DIMM") provide a high-bandwidth, high-capacity, and low-latency communication channel between a host processor or memory controller and a computer's memory subsystem. In contrast to conventional parallel stub bus memory subsystems, FB-DIMM memory subsystems utilize a serial channel. The serial channel contains multiple high speed differential point-to-point unidirectional links, segmented into northbound and southbound lanes.

The FB-DIMM uses an advance memory buffer ("AMB") to manage communication across the serial channel. The AMB responds to channel commands directed to that particular AMB and forwards channel commands to other AMB devices on the channel. In operation, multiple serial data streams are carried on each bit lane and received by the AMB using a plurality of transceivers associated with each bit lane. The transceivers demultiplex each serial data stream, generating parallel frame data for use by the DRAMs located on the FB-DIMM module.

However, before channel and DRAM commands can be communicated to the AMB, the serial channel must be initialized. The AMB performs the serial channel initialization, which may include a serial channel training procedure to optimize data transport across all bit lanes. Conventional methodologies for serial channel initialization can be complicated and may in fact add latency to data transport across the serial channel.

SUMMARY

In accordance with the invention, a method of performing clock calibration and de-skew on a multi-lane high speed serial interface. The method comprising, receiving a plurality of first data frames on a plurality of serial-lane transceivers, wherein each of the plurality of first data frames includes a training sequence header pattern; generating a plurality of event signals based on each of the first data frames; and aligning a core clock, having a first phase, with the first data frame of the plurality of first data frames associated with a slowest bit lane based on the plurality of event signals.

These and other embodiments will be described in further detail below with respect to the following figures, which are incorporated in and constitute a part of this specification.

In the figures, elements having the-same designation have the same or similar function.

DETAILED DESCRIPTION

In the following description specific details are set forth describing certain embodiments of the invention. It will be apparent, however, to one skilled in the art that the present invention may be practiced without some or all of these specific details. The specific embodiments presented are meant to be illustrative of the present invention, but not limiting. One skilled in the art may realize other material that, although not specifically described herein, is within the scope and spirit of this disclosure.

Figure 1:
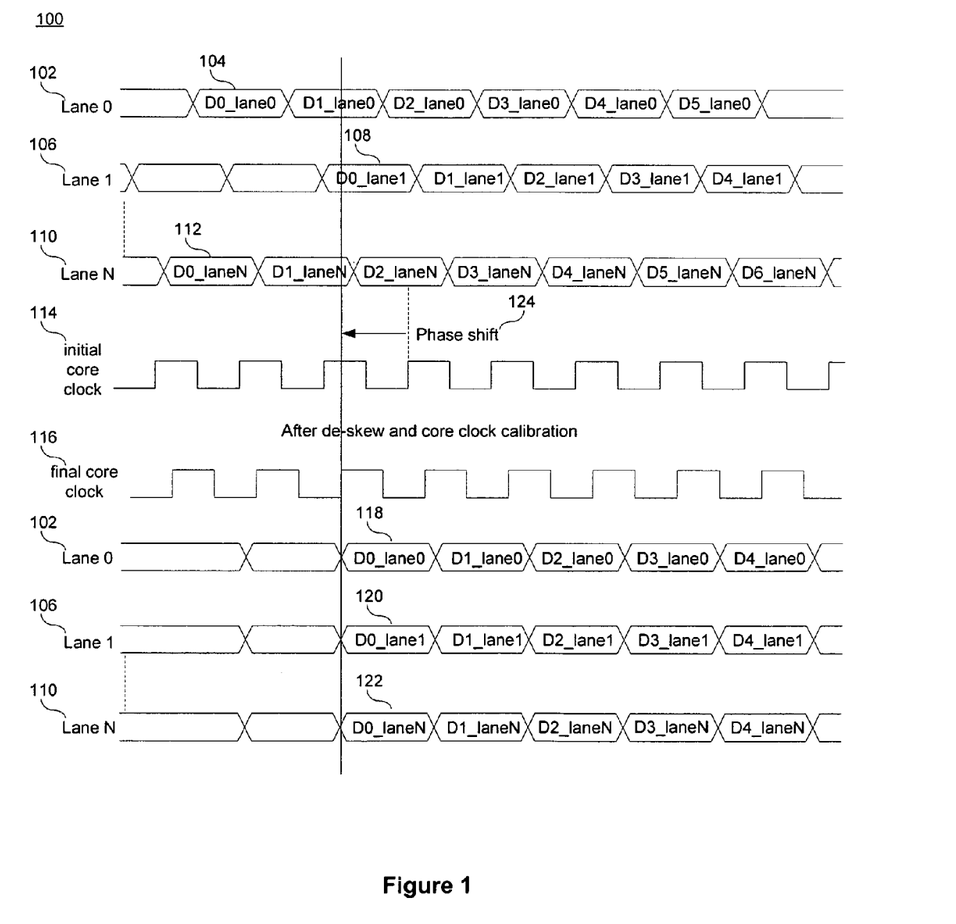
FIG. 1 illustrates a signal timing waveform diagram in accordance with some embodiments of the present invention.

FIG. 1 illustrates a signal timing waveform diagram 100 of a core clock calibration and a de-skew operation in accordance with some embodiments of the present invention. FIG. 1 shows N+1 lanes, lane 0 102 and lane 1 106 through lane N 110, along with initial core clock signal 114, all of which represent southbound serial bit lanes and a core clock signal before serial channel training, respectively. The host commences serial channel training by sending a common training sequence, which in some embodiments is composed of an ordered set of data frames D0 through D11, on each southbound bit lane. For simplicity sake, data frames D0 through D6 are shown in FIG. 1. Here, for example, data D0 represents the header of the ordered set, which is used to align the serialized data carried by each lane onto the associated frame boundaries. In some embodiments such as those shown in FIG. 1, data frame D0 may be a header, indicating the first frame in a series of data frames. The header may include a header pattern, which in some cases may be a continuous string of nine ones. Data frame D0_lane 0 104 depicts the relative timing position of the header on lane 0 102. Similarly, frame data D0_lane 1 108 through D0_lane N 112 depict the relative timing positions of the header on lane 1 106 through lane N 110, respectively. For illustrative purposes, in the example shown in FIG. 1, lane 1 106 is the slowest lane, as shown by the late arrival of the header, data fame D0 108, relative to the arrival of the header in the other southbound lanes. The relative differences between the timing positions of data frame D0 on the southbound bit lanes represents the amount of bit skew on the serial link at a particular AMB. As illustrated in FIG. 1, the maximum skew between the bit lanes can be greater than a one frame cycle. In general, however, the skew may be greater than or less than one frame cycle.

In operation, the bit de-skew procedure properly aligns the header on each southbound lane such that their relative timing positions are the same. For example, upon completion of the bit de-skew procedure, headers D0_lane 0 118 and D0_lane 1 120 through D0_lane N 122 are aligned across lane 0 102 through lane N 110. Following the bit de-skew procedure, the core clock may be calibrated to minimize latency of the serial channel. In some embodiments, as shown in FIG. 1, latency is minimized by aligning the core clock and the header of the slowest bit lane. For example, initial core clock signal 114 is phase shifted to align with header D0_lane 1 108. As a result, final core clock signal 116 is phase shifted from initial core clock signal 114 and phase aligned with lane 1 106. Because the headers 118, 120, through 122 have been de-skewed and the core clock phase adjusted to align with the slowest bit lane, the frame data may now be optimally transmitted to the DRAMs. More detail on the core clock calibration and de-skew operation are provided in the discussion below.

Figure 2:
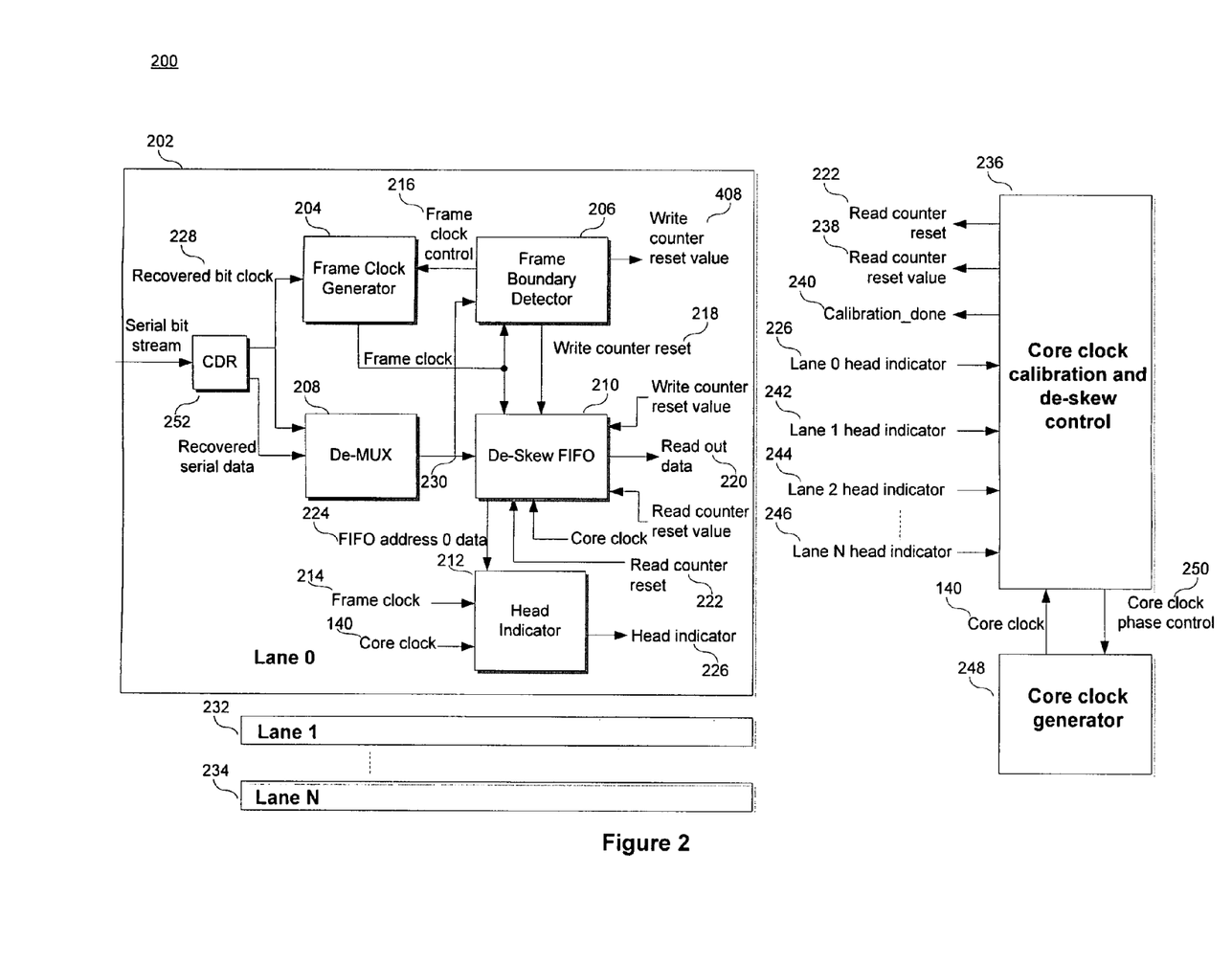
FIG. 2 shows an exemplary high-level block diagram illustrating the data flow between modules in a system for performing core clock calibration and bit de-skew in accordance with some embodiments of the present invention.

FIG. 2 shows an exemplary high-level block diagram illustrating the data flow between modules in system 200 for performing core clock calibration and bit de-skew in accordance with some embodiments of the present invention. System 200 includes, among other things, multiple transceivers 202, 232, through 234, associated with lane 0 102, lane 1 106, through lane N 110, respectively. System 200 further includes core clock calibration and de-skew control module 236 and core clock generator 248.

Lane 0 transceiver 202 is illustrated in FIG. 2. Transceiver 232 through 234 are substantially similar to transceiver 202. Lane 0 transceiver 202 includes frame clock generator 204, frame boundary detector 206, de-multiplexer ("de-mux") 208, de-skew FIFO 210, and head indicator 212. In some embodiments, clock data recovery module 252, which may be a phase interpolator module, may be used to extract a clock signal from the serial bit stream. De-mux 208 receives the recovered serial data and recovered bit clock signal 228 from lane 0 102 and generates a corresponding parallel data set 230. Frame boundary detector 206 receives parallel data set 230 from de-mux 208 and analyzes parallel data set 230 for the presence of a training pattern, more specifically, header data frame D0. Once header data frame D0, which is data frame D0_lane 0 104, is detected, frame boundary detector 206 generates frame clock control signal 216 and write counter reset 218. For example, in operation, frame clock control signal 216 may provide phase adjustments to frame clock 214 which may cause frame clock 214 to be phase aligned with the header data frame D0_lane 0 104. Subsequently, frame boundary detector 206 may generate write counter reset 218 to reset the de-skew FIFO write counter.

In some embodiments, frame clock generator 204 outputs a frame clock signal 214 that is phase aligned with header data frame D0_lane 0 104 based on receipt of frame clock control signal 216 and recovered bit clock signal 228 from the clock data recovery module ("CDR") 252. For example, in some embodiments, frame clock generator 204 may include a multi-stage divider coupled to receive recovered bit clock signal 228 and to generate frame clock signal 214. Frame clock control signal 216 may be used to select the divider stage to produce the appropriate phase adjusted frame clock 214. Frame clock 214, along with write counter reset signal 218, synchronize the transfer of parallel data set 230 from de-mux 208 to de-skew FIFO 210. This, in turn, enables the parallel data to be properly read out from lane 0 transceiver 202 using the correct frame boundaries. De-skew FIFO 210 uses write counter reset signal 218 from frame boundary detector 206 to ensure that parallel data set 230 is written into the proper address of de-skew FIFO 210. Once header data frame D0_lane 0 104 is detected by frame boundary detector 206, write counter reset signal 218 is asserted, causing header data frame D0_lane0 104 to be written to address 0 of de-skew FIFO 210. Head indicator 212 reads address 0 of de-skew FIFO 210 and compares the stored value with a user-programmed value, consistent with a standard's-based or user defined training sequence header pattern. When the training sequence header pattern is equal to the value stored in address 0 of de-skew FIFO 210, head indicator 212 generates event signal head indicator signal 226. Based on the assertion of head indicator signal 226, core clock calibration and de-skew control module 236 may determine that lane 0 transceiver 202 has detected the training sequence header pattern.

Lane 1 receiver 232 through lane N receiver 234 can include equivalent functionality as previously described regarding lane 0 202. For simplicity, these features of lane 1 receiver 232 through lane N receiver 234 are not explicitly depicted. However, some, if not all, of lane 1 receiver 232 through lane N receiver 234 include the components described for lane 0 receiver 202. It should be appreciated that FIG. 2 is provided for purposes of illustration and not as limitation as to the scope of the invention.

Core clock calibration and de-skew module 236 and core clock generator 248 provide a phase adjusted core clock signal 140 to each of bit lane transceivers 202 and 232 through 234. The core clock phase adjustment procedure begins when each bit lane head indicator signal is active. For example, in the embodiment described in FIG. 2, the core clock phase adjustment procedure may be initiated when lane 0 head indicator 226, lane 1 head indicator 242, lane 2 head indicator 244, through lane N head indicator 246 are contemporaneously in an active state. Using the status of each bit lane head indicator, core clock calibration and de-skew control module 236 searches for the slowest bit lane. In some embodiments, for example, core clock calibration and de-skew module 236 increases the phase of core clock signal 140 received from core clock generator 248 until one of the bit lane head indicators is inactive. Next, core clock calibration and de-skew module 236 decrease the phase of core clock signal 140 until each bit lane head indicator status is active, indicating core clock signal 140 is phase aligned with the slowest bit lane. Upon completion of the core clock phase adjustment, core clock and de-skew module 236 resets all read counters of the de-skew FIFOs within each bit lane transceiver and generates the associated reset values. For example, for bit lane 0 102, de-skew FIFO 210 receives read counter reset 222 and associated read counter reset value 238 from core clock calibration and de-skew module 236. This, in turn, provides de-skew FIFO 210 with the beginning address used to read out data bits from lane 0 102. Because the de-skew FIFOs associated with lane transceivers 202 through 234 are coupled to read counter reset 222 and read counter reset value 238, serial data is simultaneously read out of each de-skew FIFO, bit de-skewed and phase aligned with the slowest bit lane. Further detail on the core clock calibration and de-skew module 236 and core clock generator module 248 are provided in the discussion below.

Figure 3:
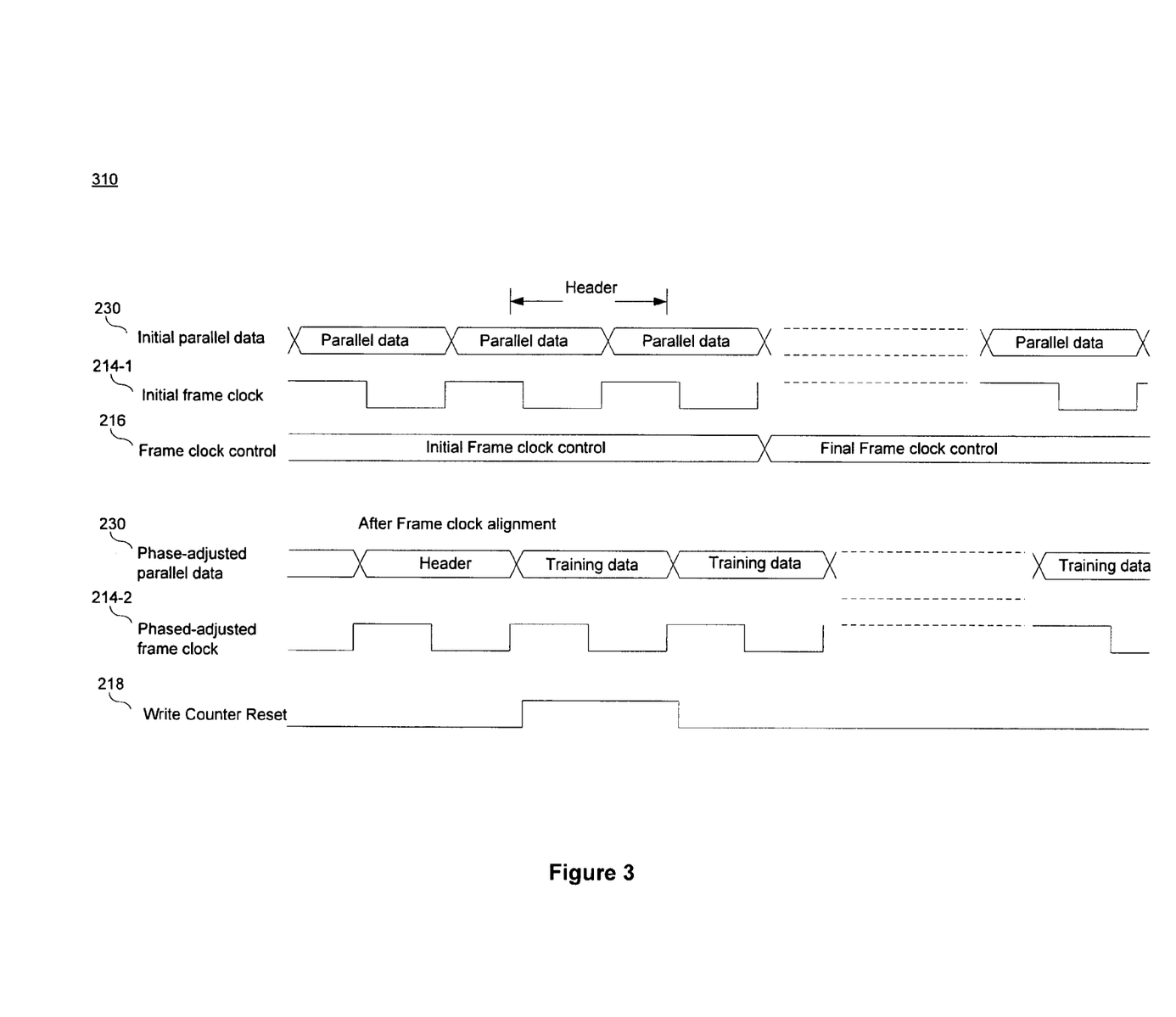
FIG. 3 illustrates a signal timing waveform diagram of an exemplary operation performed by a frame buffer detector in accordance with some embodiments of the present invention.

FIG. 3 illustrates a signal timing waveform diagram 310 of an exemplary operation performed by frame boundary detector 206 in accordance with some embodiments of the present invention. Frame boundary detector 206 may receive parallel data 230 comprising a header frame not aligned with an individual parallel data frame. In some embodiments, the parallel data frame boundaries may be determined based on the rising edge of initial frame clock 216. As previously described, frame boundary detector 206 identifies the header frame in parallel data 230, and edge aligns the phase of initial frame clock 214-1 to the header frame using frame clock control signal 216. As previously discussed, frame clock control signal 216 may be used to select the divider stage to produce the appropriate phase adjusted frame clock 214. Following the frame clock alignment process, the rising edge of phase-adjusted frame clock signal 214-2 may be phase aligned with the header frame within parallel data 230. Having completed the frame clock alignment process, frame boundary detector 206 may generate write counter reset 218 in conjunction with the falling edge of the parallel data frame comprising the header frame.

Figure 4:
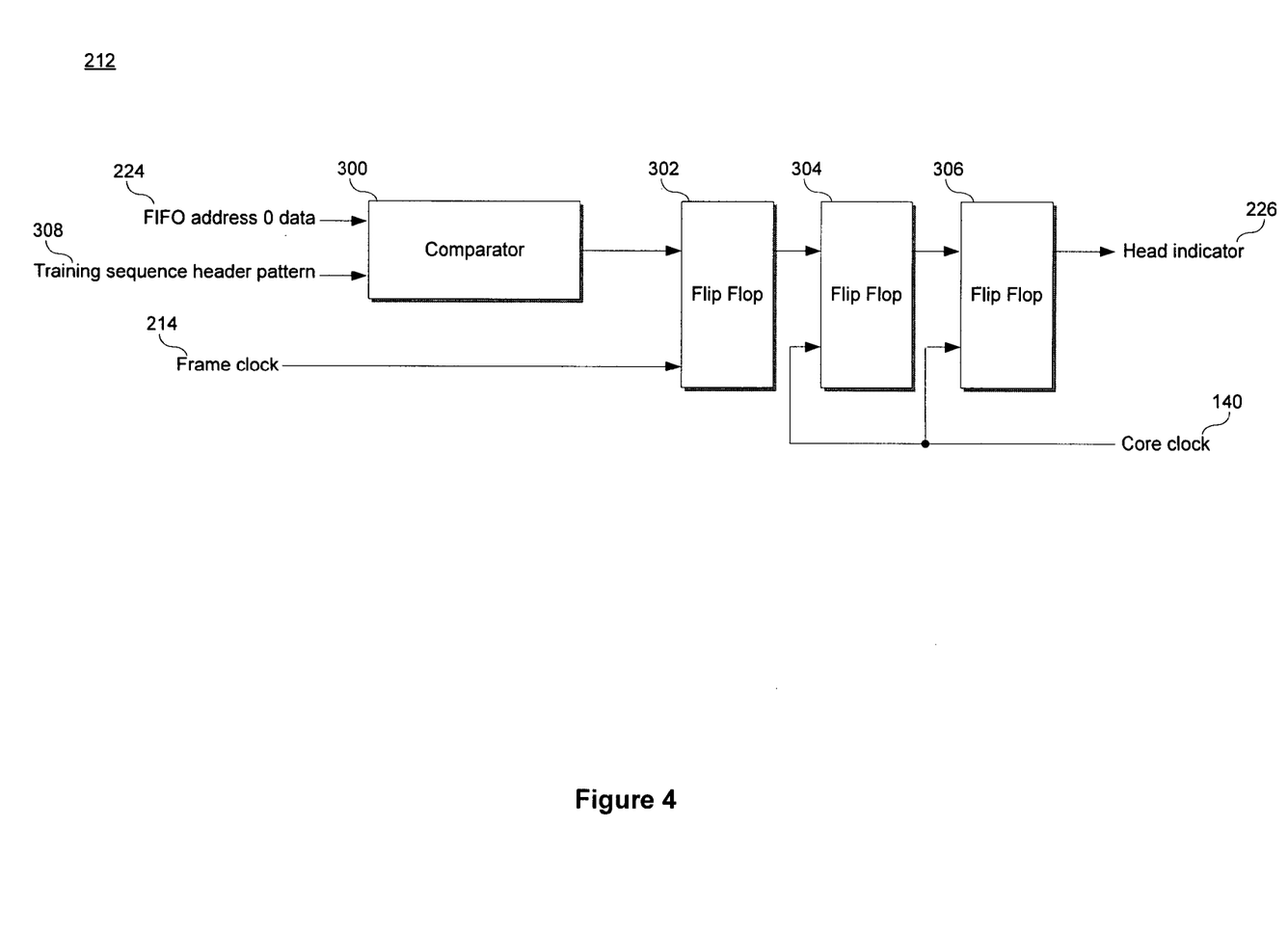
FIG. 4 illustrates an exemplary low-level data flow between modules in a head indicator module in accordance with some embodiments of the present invention.

FIG. 4 illustrates an exemplary data flow between modules in head indicator module 212 in accordance with some embodiments of the present invention. The embodiment of head indicator 212 shown in FIG. 4 includes comparator 300 and flip flops 302, 304, and 306 coupled in series. Comparator 300 receives two data inputs used to generate a comparator output. A first data input, FIFO address 0 data 224, is received from de-skew FIFO 210. A second data input is coupled to a register that stores training sequence header pattern 308, as defined in the JEDEC Standard—"FBDIMM: Architecture and Protocol," JESD206, January 2007. When the data stored in address 0 of de-skew FIFO 210 is equal to the training sequence header pattern 308, the output signal from comparator 300 is latched into flip flop 302 using frame clock 214. Flip flop 304 receives the output signal from flip flop 302 and stores the signal using core clock signal 140. Consequently, the output signal from comparator 300 is transferred from the frame clock domain to the core clock domain. In some embodiments, flip flop 306 may be coupled to flip-flop 304 to minimize meta-stability issues. Here, flip flop 306 receives the output signal from flip flop 304 and stores that output signal using core clock signal 140 to latch flip flop 304. Accordingly, the output signal from flip flop 306 represents head indicator signal 226 for lane 0 102.

Figure 5:
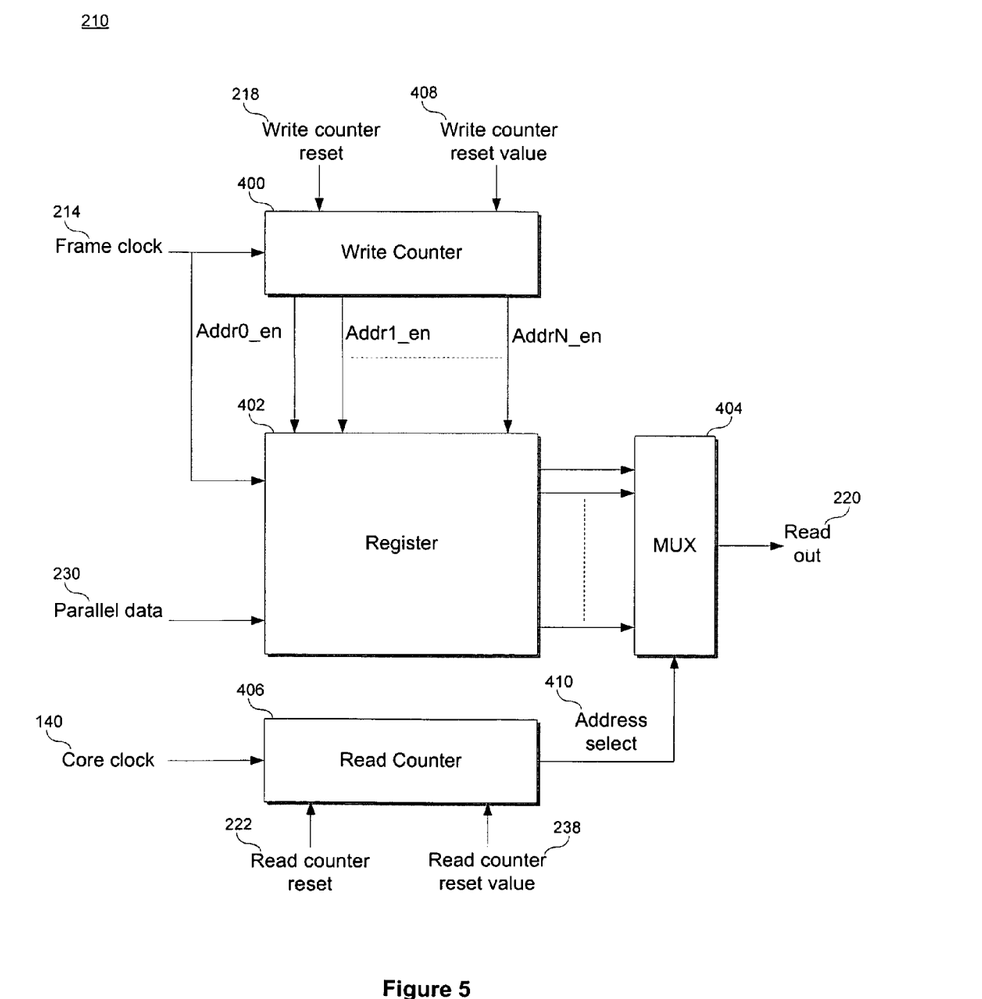
FIG. 5 illustrates an exemplary block diagram showing data flow between modules in a de-skew FIFO in accordance with some embodiments of the present invention.

FIG. 5 illustrates an exemplary block diagram showing data flow between modules in de-skew FIFO 210 in accordance with some embodiments of the present invention. De-skew FIFO 210 receives parallel data 230 stored in the frame clock domain and converts it to serial data 220 stored in the core clock domain. Serial data 220 is subsequently read out phase aligned with the other bit lanes.

As shown in FIG. 5, de-skew FIFO 210 includes write counter 400, register 402, read counter 406, and multiplexer ("mux") 404. Write counter 400 controls the order that incoming frame data is stored in de-skew FIFO 210. In some embodiments, address 0 of register 402 may be initialized with write counter reset value 408, generated by frame boundary detector 206, when header data frame D0_lane0 104 is detected by frame boundary detector 206, generating write counter reset 218. Write counter 400 receives write counter reset 218 and corresponding write counter reset value 408. Write counter reset 218 may be used to generate a write pointer to address 0 of register 402 in order to store write counter reset value 408. In some embodiments, write counter reset value 408 may include the header, which may be stored in address 0 of register 402 based on write counter 400 output addr0_en. Parallel data 230, may be stored in register 402 based on frame clock 214 and write counter 400. In some embodiments, parallel data 230 may include subsequent training sequence patterns that can be stored in consecutive addresses of register 402. For example, frame clock 214 can be used to increment write counter 400 in conjunction with latching parallel data 230 into register 402. Register 402 may include multiple output lines, where each output line corresponds to a unique register address. Each output line may be coupled to mux 404, which selects the register, address to read out of de-skew FIFO 210 in conjunction with read counter 406.

Read counter 406 determines which register address is read out of de-skew FIFO 210 by generating the address select input 410 received by mux 404. In some embodiments, upon completion of the core clock calibration procedure, core clock calibration and de-skew control module 236 outputs read counter reset 222 to reset all de-skew FIFO read counters. Read counter reset 222 may be used to generate a read pointer to the first address to be read out of register 402. Read counter reset value 238 can provide the location of the first address to be read out of register 402 upon completion of the core clock calibration procedure. For example, read counter reset value 238 may be set to zero in response to a read counter reset enable signal (not shown). This in turn, sets the value of read counter 406 to zero. Core clock signal 140 increments read counter 406, causing address select input 410 to increment accordingly. Mux 404 receives address select input 410 causing data stored in the corresponding register address to be read out of de-skew FIFO 210 serially.

Figure 6:
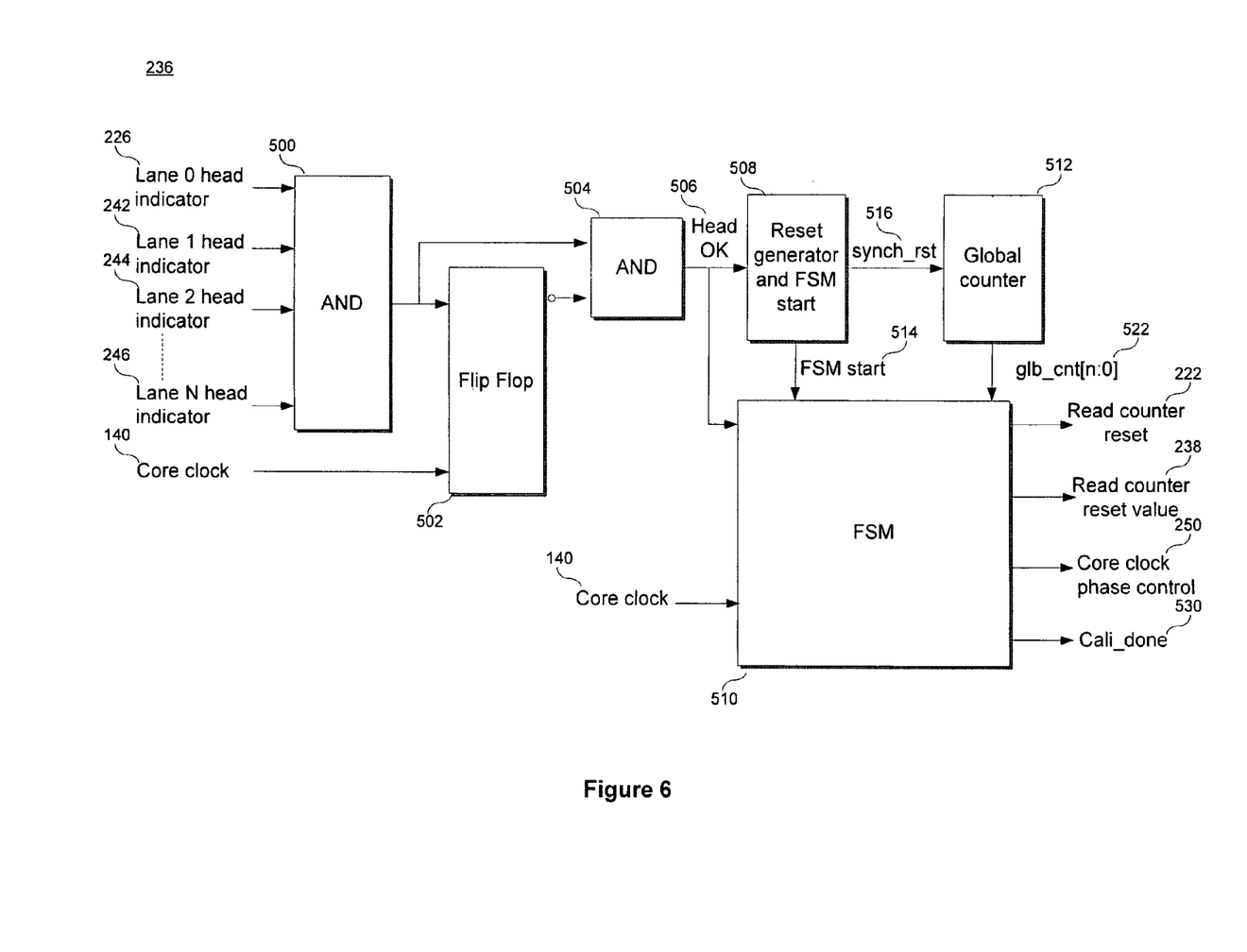
FIG. 6 is a block diagram that illustrates data flow between modules in a core calibration and de-skew control module in accordance with some embodiments of the present invention.

FIG. 6 is a block diagram that illustrates data flow between modules in a core calibration and de-skew control module 236 in accordance with some embodiments of the present invention. As previously described, core clock calibration and de-skew module 236 and core clock generator 248 provide a phase adjusted core clock signal 140 and bit de-skew control to each lane transceiver. Core calibration and de-skew control 236, as shown in FIG. 6, includes AND gates 500 and 504, flip flop 502, reset generator and finite state machine ("FSM") start module 508, global counter 512, and core clock calibration FSM 510. AND gate 500 receives head indicator signals generated by each bit lane. For example, lane 0 head indicator 226, lane 1 head indicator 242, lane 2 head indicator 244, through lane N head indicator 246 are coupled to the input of AND gate 500, as shown in FIG. 6. When all head indicator signals are valid, AND gate 500 outputs a logic high. Flip flop 502 receives the output of AND gate 500 and latches the logic high output signal using the core clock signal 140. The output signal from flip flop 502 and the output signal from AND gate 500 are coupled to a first and second input of AND gate 504. When the output signal from AND gate 500 is a logic high, AND gate 504 generates a logic high composite signal called "head ok" 506. This, in turn, causes reset generator and FSM start module 508 to output signals synch_rst 516 and FSM start 514. Global counter 540 receives the synch_rst 516 and, in response, sets global counter 540 to one. In some embodiments, such as those shown in FIG. 6, global counter 540 may be an integer counter with a maximum value of n−1, where n is an integer equal to the period of the training sequence.

Core clock calibration FSM 510 receives FSM start signal 514, which starts the core clock calibration procedure. In some embodiments, core clock calibration FSM 510 comprises additional inputs head ok 506, core clock signal 140 from core clock generator module 248, and glb_cnt[n:0] 522. In operation, core clock calibration FSM 510 adjusts output core clock phase control 250, which in turn incrementally adjusts the phase of core clock signal 140 in a stepwise manner. In general, the step size may be represented as 1/N of the period of core clock, where N is an integer. In some embodiments, the AMB design may use a step size equal to ⅙ of the period of core clock signal 140. In that case, N equals 6.

Figure 7:
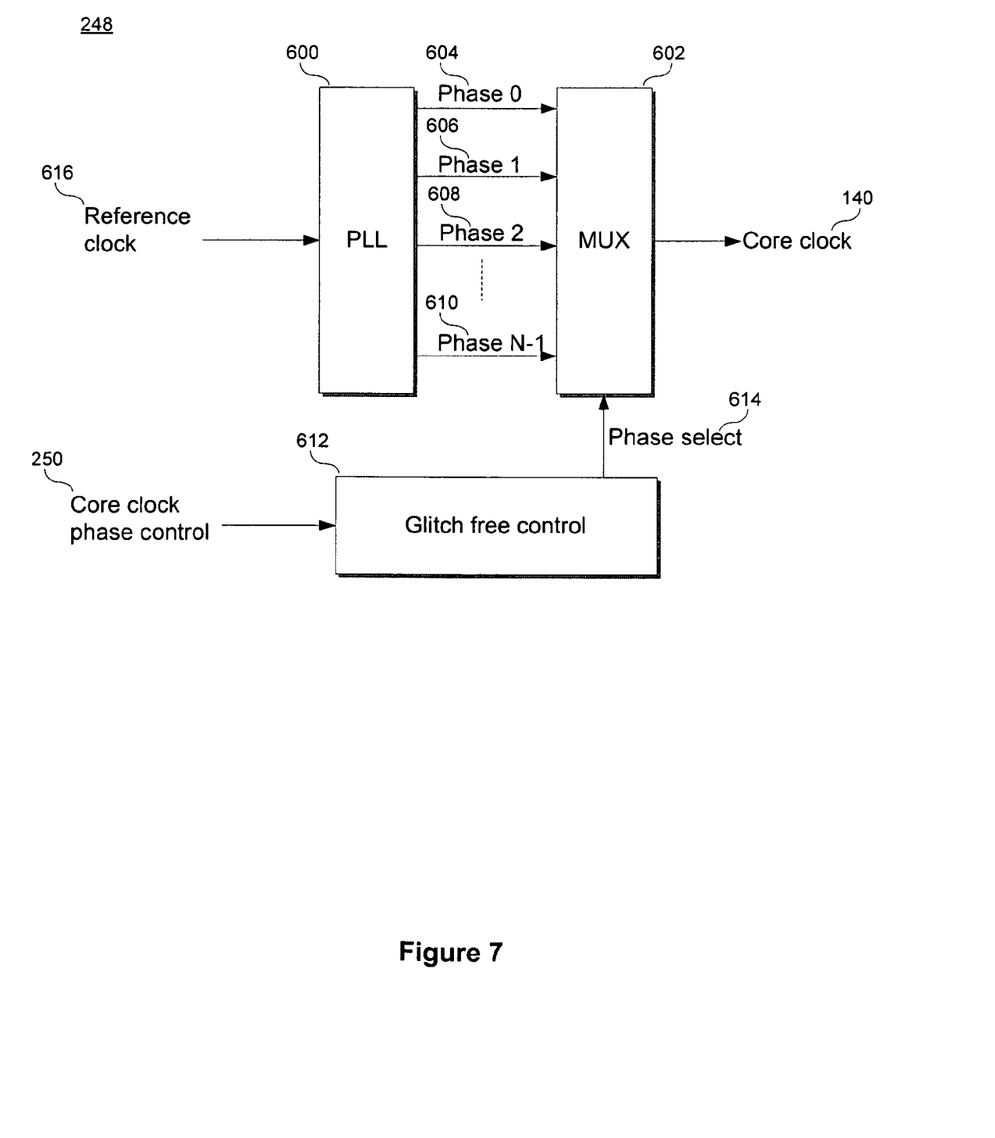
FIG. 7 illustrates an exemplary data flow between modules in a core clock generation module in accordance with some embodiments of the present invention.

FIG. 7 illustrates an exemplary data flow between modules in a core clock generation module 248 in accordance with some embodiments of the present invention. Core clock generation module 248 may include PLL 600, multiplexer ("mux") 602, and glitch free control 612. PLL 600 generates multiple clock signals, varying in phase, derived from reference clock signal 616. Core clock signal 140 may be phase coherent and an integer multiple of reference clock signal 616. Accordingly, output phase 0 604, phase 1 606, phase 2 608, through phase N 610 may also be phase coherent with core clock signal 140. Mux 602 receives the multiple clock signals from PLL 600 and in conjunction with phase select signal 614, selects one or more of the multiple output clocks to serve as a phase-adjusted core clock signal 140. Here, phase select signal 614 is output from glitch free control module 612, based on core clock phase control signal 250. Glitch free control module 612 minimizes the occurrence of glitches when the output of mux 602 changes. For example, glitch free control module 612 may limit changes to output phase select signal 614 to periods when core clock signal 140 is in a low state. As a result, the occurrences of a glitch on core clock signal 140 may be minimized when the output of mux 602 changes. In operation, the phase of core clock signal 140 may be increased and decreased by incrementally applying positive phase adjustments to core clock signal 140. In both cases, glitch free control module 612 generates phase select signal 614 to select at least one of PLL 600 output clocks in conjunction with core clock phase control signal 252. The selected output clock is output from mux 602 to provide the phase-adjusted core clock signal 140. To provide the appropriate granularity of step size phase adjustments, the phase of each output signal from PLL 600 may be configured to be one step size greater than the previous output. PLL 600 outputs n clock phases of increase phase. For example, phase 1 606 may be greater than the phase of phase 0 604 by a step size of 1/N. Similarly, the phase of phase 2 608 may be greater than the phase of phase 1 606 by a step size of 1/N.

Figure 8:
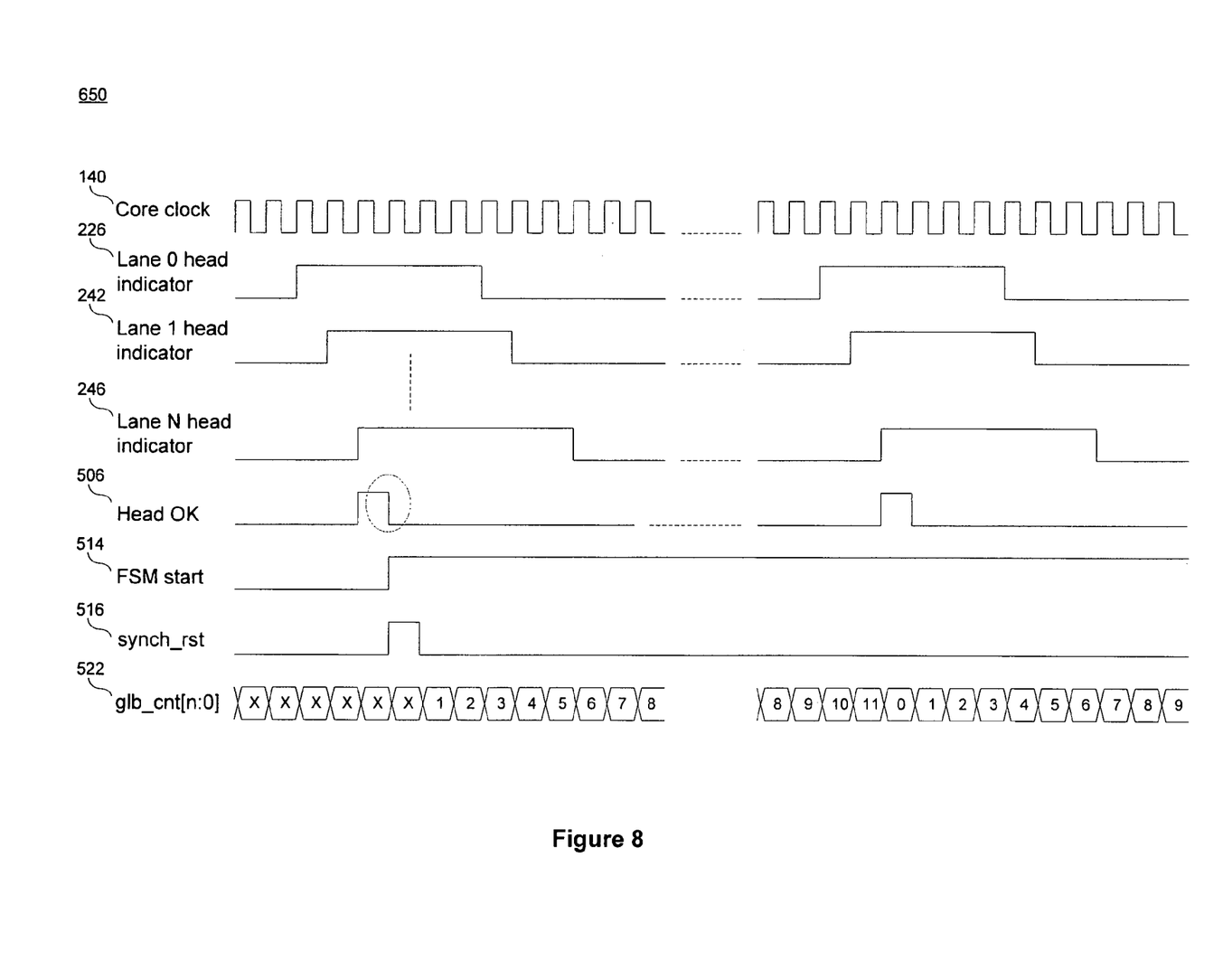
FIG. 8 illustrates a signal timing waveform diagram of an exemplary operation performed by reset generator and finite state machine start module in accordance with some embodiments of the present invention.

FIG. 8 illustrates a signal timing waveform diagram 650 of an exemplary operation performed by reset generator and finite state machine start module 508 in accordance with some embodiments of the present invention. In some embodiments, reset generator and FSM start module 508 may initiate core clock calibration FSM 510 and reset global counter 512 in conjunction with the falling edge of the first head ok 506 signal. Here, reset generator and FSM start module 508 outputs FSM start signal 514 in conjunction with the falling edge of head ok 506 to start core clock calibration FSM 510. Similarly, FSM start module 508 outputs synch_rst 516 to reset global counter 512 during the same period. For example, following the falling edge of synch-rst 516, glb_cnt[n:0] 522 is set to one. During each subsequent core clock 140 cycle, glb_cnt[n:0] 522 may increment sequentially, reaching a maximum value of n and returning to zero. As illustrated in FIG. 8, glb_cnt[n:0] 522 sequences from zero to eleven, and repeats until synch_rst 516 occurs.

Figure 9:
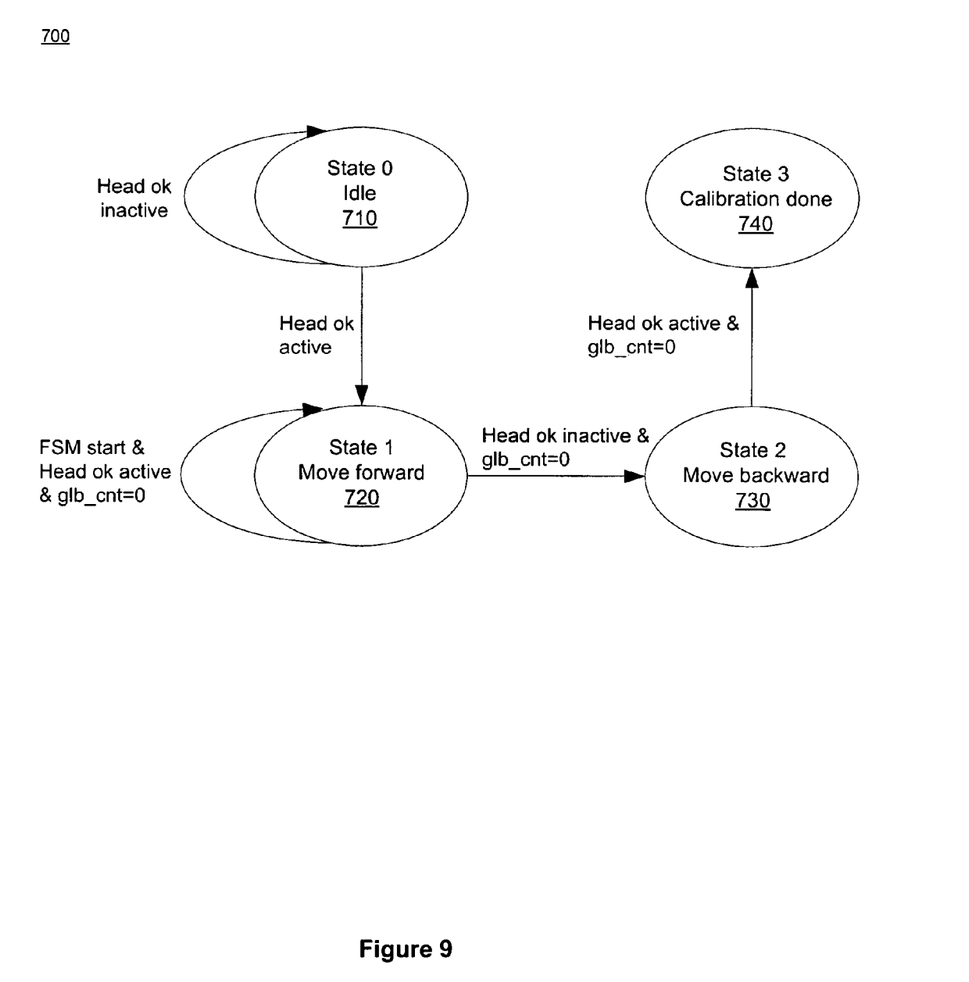
FIG. 9 illustrates an exemplary state machine diagram performed by core clock calibration finite state machine in accordance with the some embodiments of the present invention.

FIG. 9 illustrates an exemplary state machine diagram 700 performed by core clock calibration FSM 510 in accordance with some embodiments of the present invention. When head ok 506 is inactive, core clock calibration FSM 510 remains in state 0 710. When head ok 506 becomes active, core clock calibration FSM 510 transitions to state 1, where core clock calibration FSM 510 incrementally adjusts core clock phase control 250 to move the phase of core clock signal 140 forward. In some embodiments, core clock calibration FSM, 510 may remain in state 1 720, incrementally increasing the phase of core clock signal 140 until head ok 506 is inactive and glb_cnt[n:0] 522 equals zero. In operation, state 1 720 enables core clock calibration FSM 510 to determine the optimal range of positive phase increase that may be applied to core clock signal 140 in order to align core clock signal 140 with the frame clock of the slowest bit lane. In state 1 720, core clock signal 140 is moved forward one step size at a time based on the value of core clock phase control 250. Once the step size adjustment is made and glb_cnt[n:0] 522 returns to zero, head ok 506 is checked. If head ok 506 is active, the frame clock associated with the slowest bit lane may be ahead of the core clock. Accordingly, state 1 720 is repeated. On the other hand, if head ok 506 is inactive, state 1 720 transitions to state 2 730. In state 2 730, core clock calibration FSM 510 may presume the frame clock associated with the slowest bit lane is ahead of core clock signal 140. Accordingly, core clock calibration FSM 510 incrementally decreases the phase adjustment applied in state 1 720 to adjust the phase of core clock signal 140 in a manner to re-assert head ok 506. In some embodiments, core clock phase control 250 may be adjusted to move the phase of core clock signal 140 backward until head ok 506 is active when glb_cnt[n:0] 522 equals zero. When head ok 506 becomes active during state 2 730, core clock calibration FSM 510 has determined the phase adjustment to apply to align the header frames of each bit lane with core clock signal 140. In state 3 740, calibration is completed and core clock calibration FSM 510 outputs cali_done 530.

Figure 10:
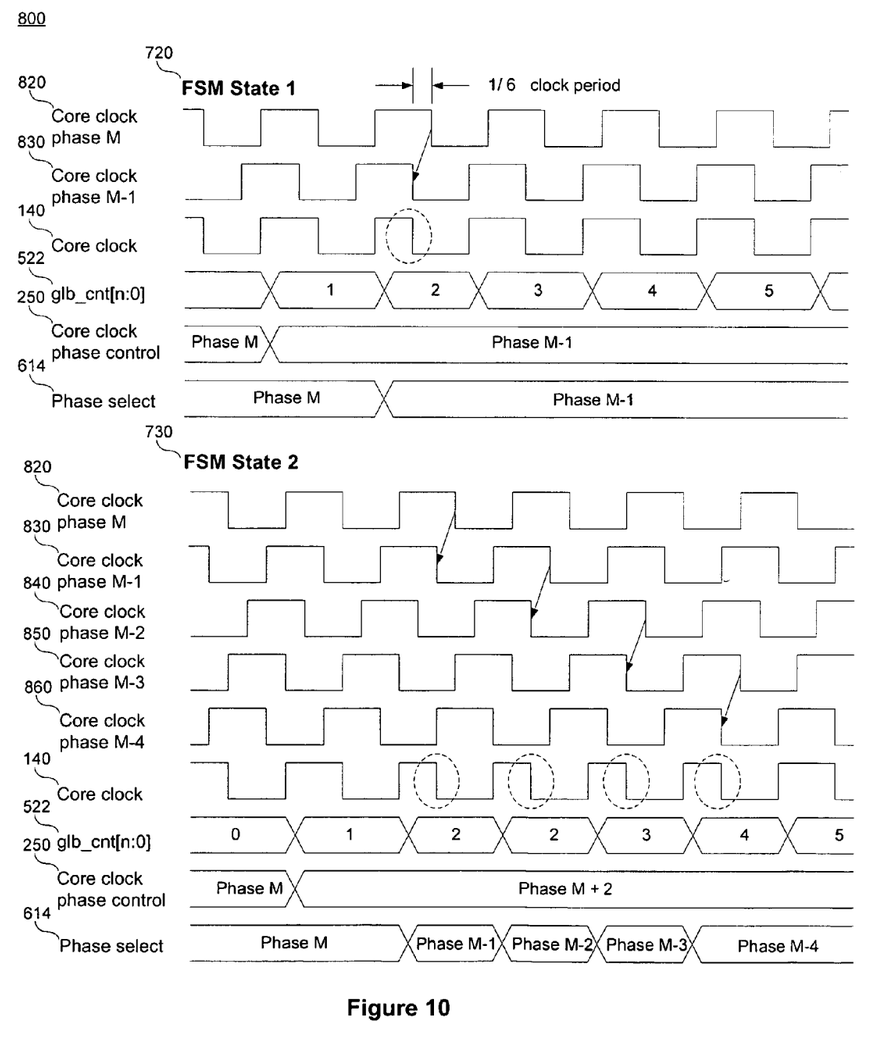
FIG. 10 illustrates a signal timing waveform diagram of exemplary operations performed by core clock calibration finite state machine in accordance with some embodiments of the present invention.

FIG. 10 illustrates a signal timing waveform diagram 800 of exemplary operations performed by core clock calibration FSM 510 in accordance with some embodiments of the-present invention. As previously discussed, in some embodiments FSM state 1 720 may move core clock signal 140 forward by incrementally adjusting core clock phase control 250. For example, to move core clock signal 140 forward one step, FSM state 1 720 sets core clock phase control 250 to M−1. In some embodiments, M may represent the initial core clock phase, phase 0 604. The step size, illustrated in FIG. 10 is ⅙ of the period of core clock signal 140. By setting core clock phase control 250 to M−1, the value of phase select signal 614 changes to reflect core clock phase control 250 setting of M−1 during the preceding clock cycle. Accordingly, mux 602 outputs a clock with a phase increased by one step size relative to the phase initial core clock signal 140.

Alternatively, in some embodiments, FSM state 2 730 may move core clock signal 140 backward by incrementally adjusting the phase of core clock signal 140 forward in a step-wise manner. For example, as shown in FIG. 10, FSM state 2 730 adjusts the phase of core clock signal 140 backward two steps by adjusting the phase of core clock signal 140 forward four steps. In some embodiments, the number of step sizes used to move the clock phase backward may be based on the jitter tolerance between the recovered frame clock 214 and core clock signal 140. For example, in some embodiments the jitter tolerance between the frame clock of the slowest bit lane and core clock signal 140 may be larger than one step size. In this case, glitch free control module 612 may be programmed to adjust the phase of core clock signal 140 backward by two steps during FSM state 2 730. In exemplary signal timing diagram 800, when glb_cnt[n:0] 522 equals one, core clock phase control signal 250 changes to M+2, corresponding to a reduction of the phase of core clock signal 140,by two steps. During the next clock cycle, glb_cnt [n:2] 522 equals 2, and phase select 614 changes to M−1, resulting in the selection of core clock phase M−1 830. During the next clock cycle, glb_cnt[n:0] 522 holds the value of two in order to compensate for the operation of applying incremental phase increases to reduce the core clock phase. Phase select 614 changes to M−2, resulting in the selection of core clock phase M−2 840. During the next clock cycle, glb_cnt[n:2] 522 resumes counting, and phase select 614 changes to M−3, resulting in the selection of core clock phase M−3 850. This process may be repeated until the phase core clock signal 140 increased by four step, as reflected by the M+2 value of core clock phase control 250.

Figure 11:
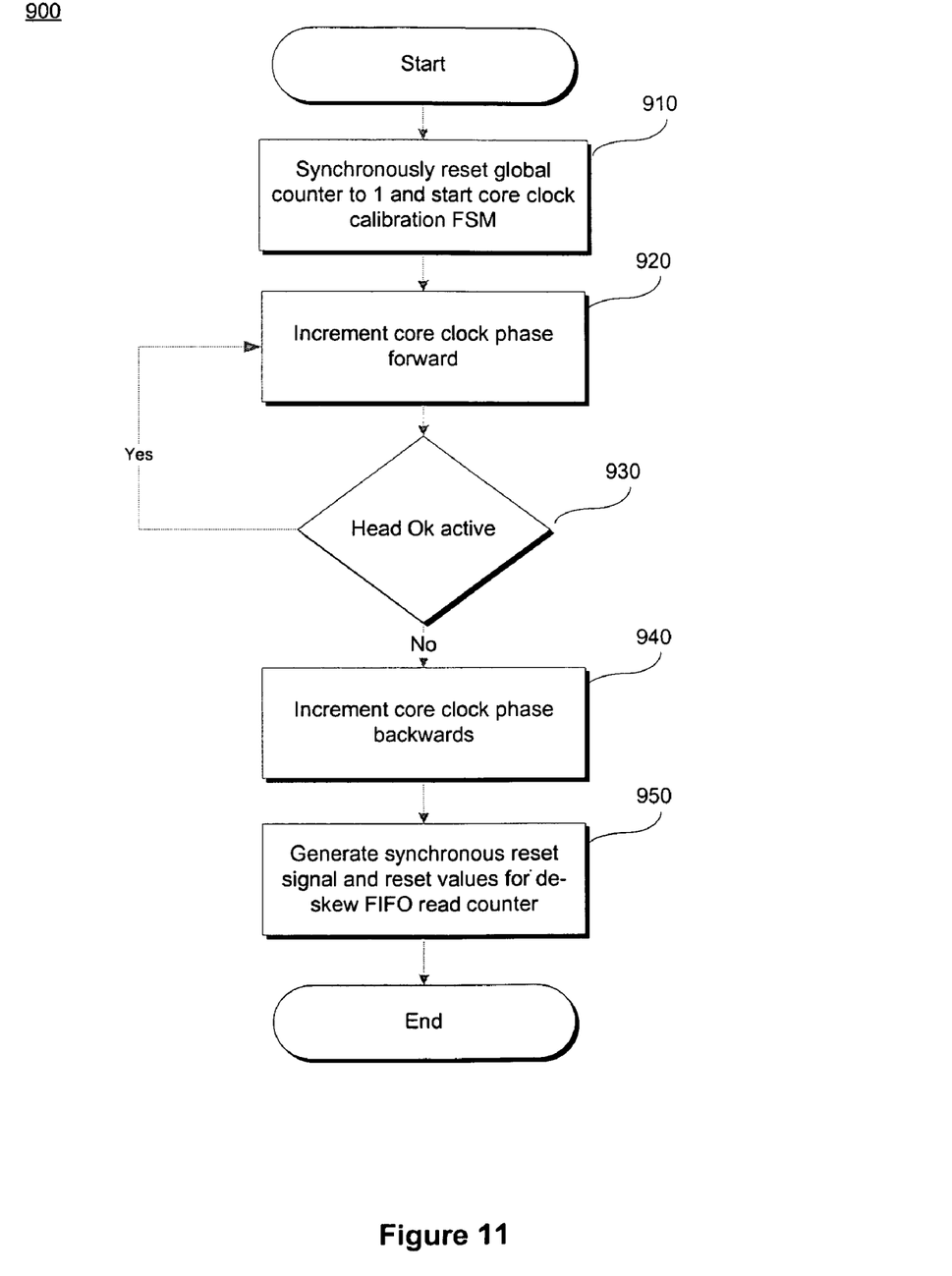
FIG. 11 illustrates a flowchart of steps in an exemplary method for performing core clock calibration and de-skew control in accordance with some embodiments of the present invention.

FIG. 11 illustrates a flowchart of steps 900 in an exemplary method for performing core clock calibration and de-skew control in accordance with some embodiments of the present invention. It will be readily appreciated by one having ordinary skill in the art that the illustrated procedure can be altered to delete steps, move steps, or further include additional steps. Instep 910, core clock calibration FSM 510 remains in state 0 710. Core clock calibration and de-skew control module 236 monitors lane 0 head indicator 226, lane 1 head indicator 242, lane 2 head indicator 244, through lane head indicator 246. Once all head indicators are active, an aggregate head indicator signal, head ok 506, is asserted and received by reset generator and FSM start module 508. This, in turn, causes reset generator and FSM start module 508 to generate FSM start signal 514 to start core clock calibration FSM 510, and to generate reset signal synch_rst 516 to reset global counter 512. This, in turn causes core calibration FSM 510 to transition from state 0 710 to state 1 720, where it performs the move forward operation.

In step 920, core clock calibration FSM 510 operates in state 1 720 to determine the optimal range of positive phase increase that may be applied to core clock signal 140 in order to align core clock signal 140 with the frame clock of the slowest bit lane. In some embodiments, step 920 may begin by adjusting the phase of core clock signal 140 forward one step, thus increasing the phase relative to the previous position of core clock signal 140. Here, the clock calibration FSM 510 remains in state 1 720, incrementally adjusting core clock phase control output signal 250 a step at a time. Based on core clock phase control signal 250, glitch free control module 612 outputs phase select signal 614 to select the appropriate core clock phase output from PLL 600 using mux 602. In some embodiments, glitch free control module 612 may be configured to sequentially select multiple core clock phase outputs from PLL 600 to achieve the phase adjustment associated with core clock phase control 250. For example, if core clock phase control equals M−2, phase select 614 may select output phase 1 606 followed by output phase 2 608.

In step 930, once global counter 512 returns to zero, core clock calibration FSM 510 checks the status of head ok signal 506. If head ok signal 506 is active, clock calibration FSM 510 repeats step 920. On the other hand, if head ok signal 506 is not active this may indicate that at least one bit lane transceiver does not detect the presence of the header pattern. In other words, core clock calibration FSM 510 presumes that the phase of core clock signal 140 is ahead of the phase of the frame clock associated with the slowest bit lane. Accordingly, core clock calibration FSM 510 transitions to state 2 720 to perform the move backward operation in step 940.

In step 940, the phase of core clock signal 140 may be reduced, relative to the previous position of core clock signal 140 in step 930, to align with the frame clock of the slowest lane. Accordingly, core clock calibration FSM 510 incrementally decreases core clock phase adjustments applied in state 1 720 to adjust the phase of core clock signal 140 in a manner to re-assert head ok 506. In some embodiments, to perform the move backward operation of step 940, FSM state 2 730 moves the phase of core clock signal 140 multiple steps forward. For example, FSM state 2 730 may adjust the phase of core clock signal 140 backward two steps by adjusting the phase of core clock signal 140 forward four steps. Core clock calibration FSM 510 may determine the number of steps to move the clock phase backward based on the jitter tolerance between the recovered frame clock 214 and core clock signal 140. For example, in some embodiments the jitter tolerance between the frame clock of the slowest bit lane and core clock signal 140 may be larger than one step size. In this case, glitch free control module 612 may be programmed to adjust the phase of core clock signal 140 backward by two steps during FSM state 2 730. In the exemplary signal timing waveform diagram 800, when glb_cnt[n:0] 522 equals one, core clock phase control signal 250 changes to M+2, corresponding to a reduction of the phase of core clock signal 140 by two steps. During the next clock cycle, glb_cnt[n:2] 522 equals two, and phase select 614 changes to M−1, resulting in the selection of core clock phase M−1 830. During the next clock cycle, glb_cnt[n:0] 522 holds the value of two in order to compensate for the operation of applying incremental phase increases to reduce the phase of core clock signal 140. Phase select 614 changes to M−2, resulting in the selection of core clock phase M−2 840. During the next clock cycle, glb_cnt[n:2] 522 resumes counting, and phase select 614 changes to M−3, resulting in the selection of core clock phase M−3 850. This process may be repeated until the phase core clock signal 140 is increased by four steps, as reflected by the M+2 value of core clock phase control 250. When glb_cnt[n:0] 522 has returned to zero and head ok 506 is active, core clock calibration FSM 510 transitions to state 3 740, described in step 950.

In step 950, core clock calibration FSM 510 has properly aligned the phase of core clock signal 140 with the frame clock of the slowest bit lane, completing the core clock calibration process. Core clock calibration FSM 510 generates reset signals, read counter reset 222, along with associated read counter values 238, to reset read counters within each de-skew FIFO. Accordingly, each de-skew FIFO may now be correctly read out for signal processing.

Other embodiments of the invention will be apparent to those skilled in the art from consideration of the specification and practice of the invention disclosed herein. It is intended that the specification and examples be considered as exemplary only, therefore, the invention is limited only by the following claims.

What is claimed is:

1. A method of performing clock calibration and de-skew on a multi-lane high speed serial interface, comprising:
   receiving a plurality of first data frames on a plurality of serial lane transceivers, wherein each of the plurality of first data frames includes a training sequence header pattern;
   generating a plurality of event signals based on each of the first data frames; and
   aligning a core clock, having a first phase, with the first data frame of the plurality of first data frames associated with a slowest bit lane based on the plurality of event signals, wherein aligning the core clock comprises:
      detecting a change in status of a composite event signal, wherein the composite event signal is active when all of the plurality of event signals are asserted;
      initiating a counter based on the change in status, wherein the counter has the same period as the core clock and a maximum value based on a period of the training sequence training sequence header pattern; and
      increasing the first phase based on a core clock phase control signal until the counter equals 0 and the composite event signal becomes inactive.

2. The method of claim 1, wherein generating the plurality of event signals comprises:
   asserting a corresponding one of the plurality of event signals when the training sequence header pattern of one of the plurality of first data frames matches a defined sequence.

3. The method of claim 1, further including:
   identifying the slowest bit lane by determining which event signal of the plurality of event signals is inactive after increasing the first phase.

4. The method of claim 3, further including:
   decreasing the first phase based on a core clock phase control signal until the counter equals 0 and the composite event signal becomes active.

5. The method of claim 4, wherein decreasing the first phase comprises:
   applying a step size phase increase to the core clock based on the core clock phase control signal, wherein the step size phase increase is based on a jitter tolerance between the core clock and a frame clock; and
   adjusting the first phase until the first phase lags a second phase of the first data frame associated with the slowest bit lane.

6. The method of claim 1, further comprising:
de-skewing the plurality of first data frames on each of the plurality of serial lane transceivers.

7. A system for performing clock calibration and de-skew on a multi-lane high speed serial interface, comprising:
a plurality of serial lane transceivers each configured to receive a first data frame from each of a plurality of lanes;
the first data frame of a slowest lane of the plurality of data lanes;
a first module configured to generate a plurality of core clock calibration signals including a core clock phase control signal based on a plurality of received event signals;
a second module configured to generate a core clock based on a reference clock and the core clock phase control signal; and
a de-skew first in, first out (FIFO) module in each of the transceivers, the de-skew FIFO module receiving the core clock, at least one of the core clock calibration signals, and data, the de-skew FIFO module configured to temporarily store the data and output the data based in part on the received core clock and received at least one core clock calibration signal.

8. The system of claim 7, wherein the core clock is aligned with the first data frame of the slowest lane of the plurality of data lanes based on a plurality of event signals received from the plurality of serial lane transceivers.

9. The system of claim 7, wherein each of the plurality of serial lane transceivers comprises:
a frame clock generator configured to provide a frame clock signal based on a recovered bit clock and a frame clock control signal associated with a bit lane,
a frame boundary detector configured to provide signals upon detection of a training sequence header pattern, and
a head indicator module configured to provide one of a plurality of event signals upon detection of the training sequence header pattern.

10. The system of claim 9, wherein the frame boundary detector is configured to output a write counter reset and a write counter reset value based on detection of the training sequence header pattern.

11. The system of claim 9, wherein the data comprises subsequent training sequence header patterns and the head indicator module is configured to provide one of the plurality of event signals by comparing the training sequence header pattern with one of the subsequent training sequence header patterns stored in the de-skew FIFO module.

12. The system of claim 9, wherein each one of the plurality of event signals is generated by each of the plurality of serial lane transceivers based on detection of the training sequence header pattern in one of the plurality of data frames received by each of the plurality of serial lane transceivers.

13. The system of claim 9, wherein the first module comprises a finite state machine, the finite state machine receiving the core clock signal, a global counter signal, and at least one initiation signal and generating the plurality of core clock calibration signals.

14. The system of claim 7, wherein the second module comprises:
a phase lock loop configured to generate a plurality of output clocks based on the reference clock, wherein the plurality of output clocks have a phase relationship;
a multiplexer configured to receive the plurality of output clocks and to select one of the plurality of output clocks based on a phase select input; and
a glitch free control module configured to generate the phase select input based on the core clock phase control signal.

15. A system for performing clock calibration and de-skew on a multi-lane high speed serial interface, comprising:
a plurality of serial lane transceivers each configured to receive a first data frame from each of a plurality of lanes, wherein each of the plurality of serial lane transceivers comprise:
a frame clock generator configured to provide a frame clock signal based on a recovered bit clock and a frame clock control signal associated with a bit lane;
a frame boundary detector configured to provide signals upon detection of a training sequence header pattern; and
a head indicator module configured to provide one of a plurality of event signals upon detection of the training sequence header pattern;
the first data frame of a slowest lane of the plurality of data lanes;
a first module configured to generate a plurality of core clock calibration signals including a core clock phase control signal based on a plurality of received event signals; and
a second module configured to generate a core clock based on a reference clock and the core clock phase control signal.

16. The system of claim 15, wherein the frame boundary detector is configured to output a write counter reset and a write counter reset value based on detection of the training sequence header pattern.

17. The system of claim 15, wherein each one of the plurality of event signals is generated by each of the plurality of serial lane transceivers based on detection of the training sequence header pattern in one of the plurality of data frames received by each of the plurality of serial lane transceivers.

18. The system of claim 15, wherein the first module comprises a finite state machine, the finite state machine receiving the core clock signal, a global counter signal, and at least one initiation signal and generating the plurality of core clock calibration signals.

19. The system of claim 15, wherein the second module comprises:
a phase lock loop configured to generate a plurality of output clocks based on the reference clock, wherein the plurality of output clocks have a phase relationship;
a multiplexer configured to receive the plurality of output clocks and to select one of the plurality of output clocks based on a phase select input; and
a glitch free control module configured to generate the phase select input based on the core clock phase control signal.

20. The system of claim 15, wherein the head indicator module is configured to provide one of the plurality of event signals by comparing the training sequence header pattern with a sequence stored in a de-skew first in, first out (FIFO) module.

* * * * *